US008843649B2

(12) United States Patent
Bailey

(10) Patent No.: US 8,843,649 B2
(45) Date of Patent: Sep. 23, 2014

(54) ESTABLISHMENT OF A PAIRING RELATIONSHIP BETWEEN TWO OR MORE COMMUNICATION DEVICES

(75) Inventor: Richard Bailey, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 383 days.

(21) Appl. No.: 13/154,709

(22) Filed: Jun. 7, 2011

(65) Prior Publication Data

US 2012/0317297 A1   Dec. 13, 2012

(51) Int. Cl.
*G06F 15/16*     (2006.01)
*H04W 4/20*      (2009.01)
*H04W 12/06*     (2009.01)

(52) U.S. Cl.
CPC ............. *H04W 12/06* (2013.01); *H04W 4/206* (2013.01)
USPC ........................................................ 709/229

(58) Field of Classification Search
USPC ........................................................ 709/229
See application file for complete search history.

(56) References Cited

U.S. PATENT DOCUMENTS

| 7,817,991 | B2 | 10/2010 | Hinckley et al. |
| 2005/0066331 | A1* | 3/2005 | Inoue et al. ............ 718/104 |
| 2007/0170238 | A1* | 7/2007 | Piersol et al. ............ 235/375 |
| 2009/0034591 | A1 | 2/2009 | Julian et al. |
| 2009/0133499 | A1 | 5/2009 | Cato |
| 2010/0043056 | A1 | 2/2010 | Ganapathy |
| 2010/0082712 | A1 | 4/2010 | Pratt et al. |
| 2010/0082990 | A1 | 4/2010 | Grigorovitch |
| 2011/0059769 | A1 | 3/2011 | Brunolli |

OTHER PUBLICATIONS

Chong, et al., "How Users Associate Wireless Devices", Retrieved at <<http://mingkichong.net/wp-content/uploads/2011/01/chi2011-paper.pdf>>,May 7-12, 2011, pp. 10.
Chong, et al., "GesturePIN: Using Discrete Gestures for Associating Mobile Devices",Retrieved at <<http://pubs.cs.uct.ac.za/archive/00000627/01/p261.pdf>>, Sep. 7-10, 2010, pp. 261-264.
Wilson, et al., "BlueTable: Connecting Wireless Mobile Devices on Interactive Surfaces Using Vision-Based Handshaking", Retrieved at http://research.microsoft.com/en-us/um/people/awilson/publications/wilsongi2007/GI%202007.pdf>>, May 28-30, 2007, pp. 7.
Saxena, et al., "Secure Device Pairing based on a Visual Channel", Retrieved at << http://www.google.co.in/url?sa=t&source=web&cd=4&ved=0CDIQFjAD&url=http%3A%2F%2Fciteseerx.ist.psu.edu%2Fviewdoc%2Fdownload%3Fdoi%3D10.1.1.60.6885%26rep%3Drep1%26type%3Dpdf&ei=GxFmTc6gN5OFhQeJvlibDg&usg=AFQjCNEvWyVv7rOEzIL5iNiYkAldM9rcbQ>>, May 2006, pp. 1-17.

(Continued)

*Primary Examiner* — Shripal Khajuria
(74) *Attorney, Agent, or Firm* — Bryan Webster; Kate Drakos; Micky Minhas

(57) ABSTRACT

A communication device establishes a trusted relationship with one or more remote communication devices by capturing ambient information with both communication devices, which is sent to a comparison system that compares them. The ambient information is used as authorization information. Upon a satisfactory comparison of the ambient information captured by the communication devices, the communication device is notified and a trusted relationship may be established between it and the remote communication device. Once the trusted relationship has been established, a personal area network can be established between the communication devices.

20 Claims, 4 Drawing Sheets

(56) References Cited

OTHER PUBLICATIONS

Mayrhofer, et al., "Shake Well Before Use: Intuitive and Secure Pairing of Mobile Devices",Retrieved at <<http://eprints.comp.lancs.ac.uk/2230/1/TMC-2008-07-0279-3.pdf>>, IEEE Transactions on Mobile Computing, vol. 8, No. 6, Jun. 2009, pp. 792-806.

Peng, et al., "Point&Connect: Intention-based Device Pairing for Mobile Phone Users",Retrieved at >>http://citeseerx.ist.psu.edu/viewdoc/download?doi=10.1.1.160.796&rep=rep1&type=pdf>>, Jun. 22-25, 2009, pp. 137-149.

\* cited by examiner

ESTABLISHMENT OF A PAIRING RELATIONSHIP BETWEEN TWO OR MORE COMMUNICATION DEVICES

BACKGROUND

Many computing devices such as personal computers, mobile phones, personal digital assistants, and portable audio/video players, enable their users to access data wirelessly from remote sources. As one example, two or more computing devices may collectively form a personal area network to share data. Users of these computing devices may wish to limit access to the data shared via the personal area network to only specified computing devices. Conventional methods for sharing data such as e-mail are typically designed for long term sharing between and among devices and people that are well known to one another. These methods are less satisfactory when people are busy and on the go, particularly when they want to share data with other individuals whose contact information such as their e-mail address is not known to them

SUMMARY

Accordingly, various embodiments related to the establishment of a relationship between wireless devices are disclosed. For example, in one disclosed embodiment, a communication device is described which establishes a trusted relationship with one or more remote communication devices by capturing ambient information with both communication devices, which is sent to a comparison system that compares them. The ambient information is used as authorization information. Upon a satisfactory comparison of the ambient information captured by the communication devices, the communication device is notified and a trusted relationship may be established between it and the remote communication device. Once the trusted relationship has been established, a personal area network can be established between the communication devices.

In some embodiments, the ambient information may be passively received from a common venue in which both communication devices are located. The ambient information may be, for example, visual or audio information. Moreover, in some particular embodiments, the ambient information may be generated by one of the communication devices.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
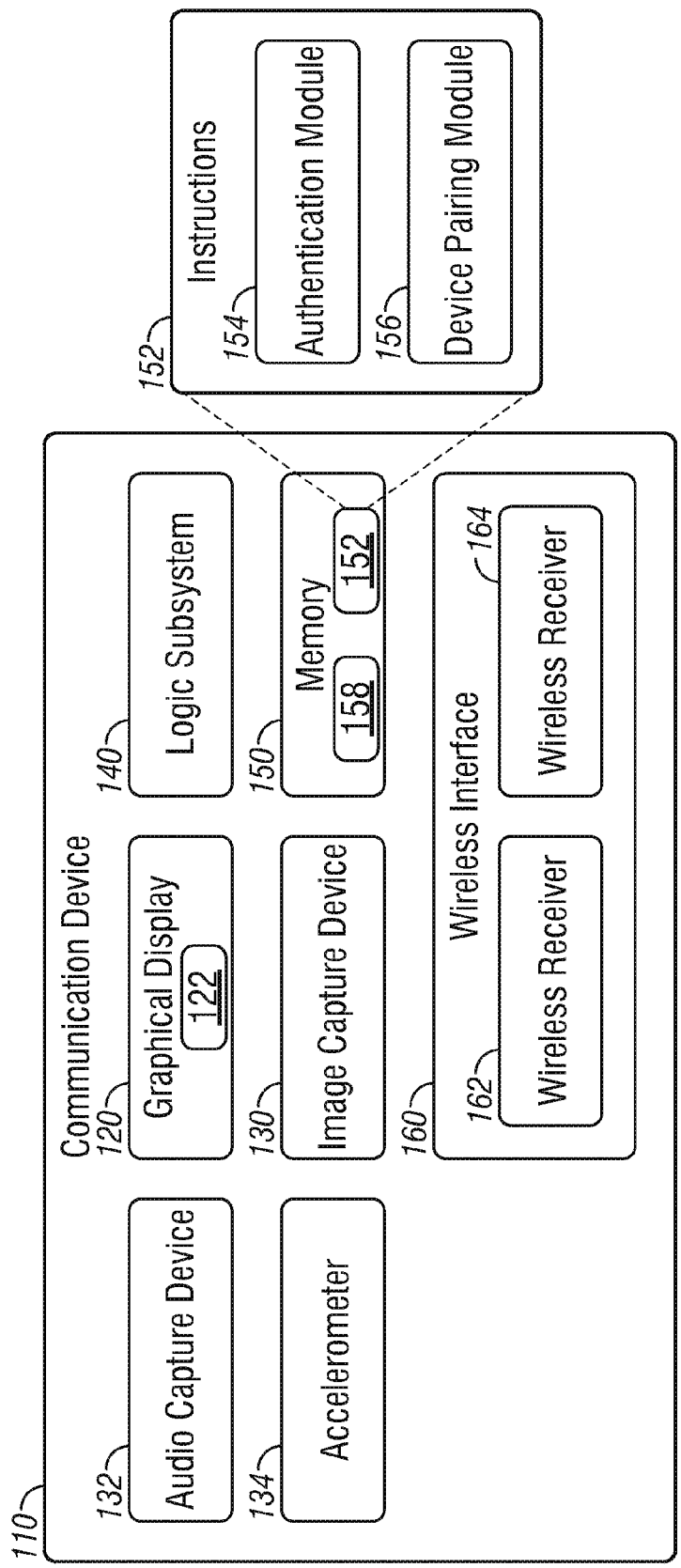
FIG. 1 schematically depicts one example of a communication device.

As will be described herein, two or more communication devices may be communicatively coupled with each other through a process referred as device pairing. Device pairing may be performed in order to establish an ad hoc, personal area network between the two or more communication devices to enable the sharing of data. Where shared data includes protected data, the device pairing process may further involve the establishment of a trusted relationship between the two or more communication devices before the protected data is shared.

Device pairing involves techniques to identify other devices that are candidates for pairing by finding correlations in data known to all the devices. For instance, one commonly employed technique is to pair devices that experience a physical bump at the same moment in time. This particular technique, however, does not easily scale upward when more than two devices are involved. However, there are other types of data known to all devices which can be easily shared and correlated.

There are many situations where two or more individuals in the same location or venue wish to establish an ad hoc, personal area network among their respective communication devices so that they can share data, for example, either through a peer-to-peer connection or a cloud service. For example, certain people at a conference, meeting, classroom, theatre, concert hall and so on may wish to share data (e.g., photos or other images, messages, etc.) among themselves but not with other individuals who are either at the same venue or remotely viewing an event occurring at the same venue. Since these individuals are all at or viewing the same venue, various attributes of the physical environment will be largely the same for both individuals. For example, the ambient audio in the venue will be largely the same for both of them. Another attribute of their environment that they have in common is visual information: the various individuals who wish to share data can capture an image in the venue that is visible to all of them.

One or more of the various environmental attributes that the communication devices share may be used as authentication data to establish a trusted relationship among those devices. In some embodiments, the two or more communication devices may share an image of a common object. As a non-limiting example, a first user may operate a first communication device to capture a first image of an object. A second user may operate a second communication device to capture a second image of the same object. The first and second images may be sent to a comparison system, which compares them to determine whether a pre-determined relationship is exhibited between the first and second images. For example, a trusted relationship may be established at the first communication device with the second communication device if the second image exhibits the pre-determined relationship to the first image. The process may be repeated at the second communication device where a bi-directional trusted relationship is to be established.

In some embodiments, the communication devices may exchange authentication data that indicates actions performed by users of the communication devices. As one example, these actions may include motion of the communication device, where users move their respective communication devices to perform a particular gesture. The movement of each communication device may be identified by authentication features (e.g. translation or blur) from one or more images captured at the communication device. As another example, the users may utilize a touch-sensitive region of their respective communication devices to record gestures that may be exchanged and compared to establish the trusted relationship.

FIG. 1 schematically depicts a non-limiting example embodiment of a communication device 110. Communication device 110 may include one or more of the following components: a graphical display 120, an image capture device 130, an audio capture device 132, a gyroscope (not shown), compass (not shown) and/or an accelerometer 134, a logic subsystem 140, memory 150, and a wireless interface 160. It should be appreciated that communication device 110 may include other suitable components beyond those specifically described herein.

Graphical display 120 may include any suitable output device for presenting visual media content. Non-limiting examples of graphical display 120 include liquid crystal displays (LCDs), organic light emitting displays (OLEDs), plasma displays, cathode ray tube (CRT) displays, electronic paper displays, light emitting diode (LED) displays, rear projection displays, and front projection displays, among others, and combinations thereof. Graphical display 120 may optionally include a touch-sensitive region 122 for receiving user input. As such, graphical display 120 may be configured to provide both input and output functionality in some embodiments. In other embodiments, graphical display 120 may be omitted from communication device 110.

Image capture device 130 may include any suitable number and configuration of optical elements for capturing images. In some embodiments, image capture device 130 may include one or more of a still camera and a video camera. It should be appreciated that, image capture device 130 may capture images on an individual image basis (e.g. when operated as a still camera) or in sequential manner (e.g. when operated as a video camera). Audio capture device 132 may include a microphone for capturing sound and other audio information that it detects. Image capture device 130 and audio capture device 132 are representative examples of information capture devices that may be associated with the communication device 110 for capturing information received from the surrounding physical environment in which the communication device is located. As noted above, some of the information that is captured may serve as authentication information that can be used to establish a trusted relationship with other communication devices.

Logic subsystem 140 may include one or more physical devices configured to execute one or more instructions. For example, the logic subsystem may be configured to execute one or more instructions that are part of one or more programs, routines, objects, components, data structures, or other logical constructs. Such instructions may be implemented to perform a task, implement a data type, change the state of one or more devices, or otherwise arrive at a desired result. The logic subsystem may include one or more processors that are configured to execute software instructions. Additionally or alternatively, the logic subsystem may include one or more hardware or firmware logic machines configured to execute hardware or firmware instructions. The logic subsystem may optionally include individual components that are distributed throughout two or more devices, which may be remotely located in some embodiments.

Memory 150 may include one or more physical devices configured to hold data and/or instructions 152 that, when executed by the logic subsystem, cause the logic subsystem to implement the herein described methods and processes. Memory 150 may include removable media and/or built-in devices. Memory 150 may include optical memory devices, semiconductor memory devices, and/or magnetic memory devices, among others. Memory 150 may include portions with one or more of the following characteristics: volatile, nonvolatile, dynamic, static, read/write, read-only, random access, sequential access, location addressable, file addressable, and content addressable. In some embodiments, logic subsystem 140 and memory 150 may be integrated into one or more common devices and/or computing systems.

As will be described in greater detail in the context of the process flow of FIGS. 3-5, instructions 152 may include one or more modules that, when executed by the logic subsystem, cause the logic subsystem to perform one or more of the various operations described herein. For example, in some embodiments, instructions 152 may include an authentication module 154 for establishing trusted relationships with remote communication devices and a device pairing module 156 for establishing personal area networks with the remote communication devices. In some embodiments, memory 150 may further include a data store 158 for storing data, including media content such as audio content, visual content, and communication content, among other suitable data. For example, data store 158 may store images captured by image capture device 130.

Wireless interface 160 may include one or more of a wireless receiver 162 for receiving wireless data transmissions from remote sources and a wireless transmitter 164 for transmitting wireless data transmissions to remote sources. For example, wireless receiver 162 may be configured to receive data broadcast by remote communication devices and wireless transmitter 164 may be configured to broadcast data to remote communication devices. In some embodiments, wireless receiver 162 and wireless transmitter 164 may be combined as a wireless transceiver.

It should be appreciated that wireless interface 160 may be configured to transfer data wirelessly using any suitable protocol, including Bluetooth, Wi-Fi, Short Message Service (SMS), and cellular telephony, among others. Furthermore, it should be appreciated that wireless interface 160 may communicate with remote sources by the transfer of electromagnetic radiation within any suitable spectral range, including microwaves, radio frequency, visible light (e.g. via a laser), and infrared light, among others.

Figure 2:
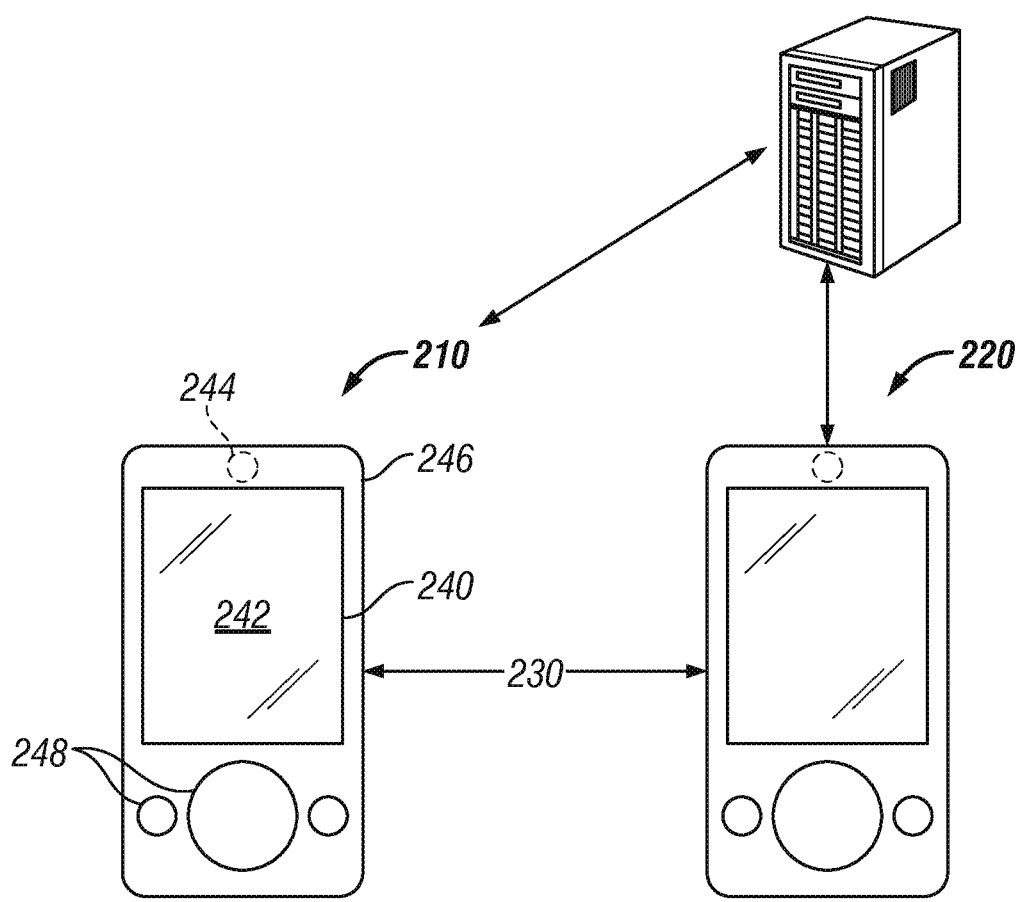
FIG. 2 illustrates a non-limiting example of an interaction between a first communication device and a second communication device.

FIG. 2 illustrates a non-limiting example of an interaction between embodiments of a first communication device 210 and a second communication device 220. In this particular example, communication device 210 and communication device 220 may each correspond to previously described communication device 100 of FIG. 1. FIG. 2 illustrates first communication device 210 interacting with second communication device 220 via wireless communication 230. As such, FIG. 2 depicts an example of device pairing between two or more communication devices which may be used to collectively establish a personal area network between these communication devices.

In some embodiments, the first and second communication devices 210 and 220 communicate with a comparison system 250 via one or more networks (not shown). For example, the network includes any wired or wireless network including, but not limited to, the Internet, cellular networks, and BLUETOOTH brand wireless networks. The comparison system 250 may be implemented by one or more computing devices arranged to provide the functionality described herein. For example, the comparison system 250 may be implemented by multiple server machines. In some embodiments, the location-comparison system 250 is implemented as a cloud service.

Wireless communication 230 may schematically represent the sharing of data. In some embodiments, data shared between two or more communication devices may include one or more of authentication data and protected data. Authentication data may include data that is received by a communication device from a remote communication device that may be used by the communication device to establish a personal area network or to establish a trusted relationship with the remote communication device. Protected data may include data that the communication device does not share with other communication devices until a trusted relationship is established. As such, transmission of protected data may not be performed in some embodiments until a trusted relationship is established with a remote source.

First communication device 210 includes a graphical display 240 as previously described with reference to graphical display 120 of FIG. 1. In some embodiments, graphical display 240 may include a touch-sensitive region 242 as previously described with reference to touch-sensitive region 122 of FIG. 1. First communication device 210 may include an image capture device 244 as previously described with reference to image capture device 130 of FIG. 1. First communication device 210 may further include a device body 246 and may optionally include one or more buttons 248. Buttons 248 may be used to receive user input in addition to or as an alternative to touch-sensitive region 242 of first communication device 210.

Second communication device 220 may include one or more similar components as first communication device 210. As such, second communication device 220 will not be described in any further detail.

Figure 3:
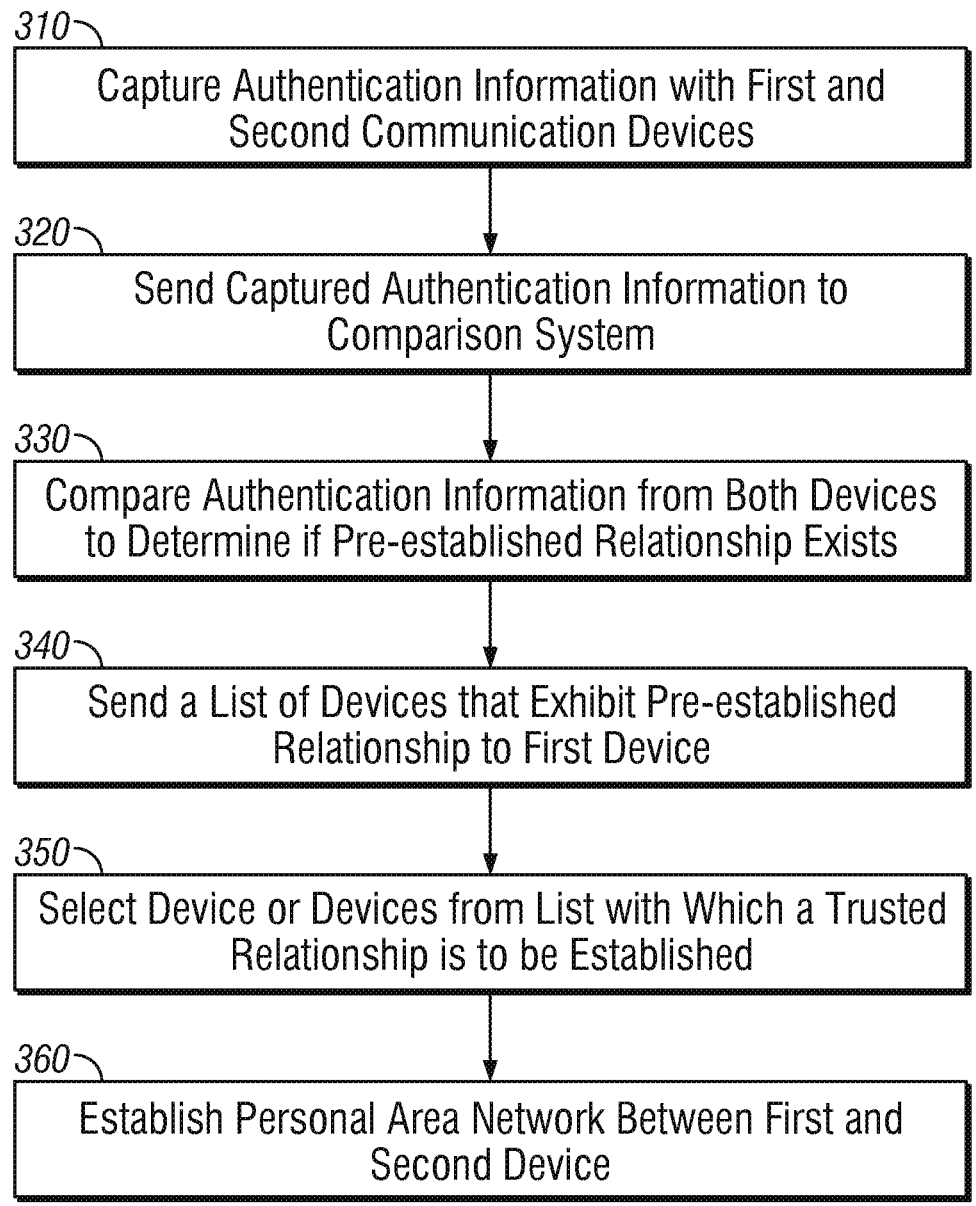
FIGS. 3-4 illustrate process flows depicting illustrative methods of establishing a trusted relationship between communication devices.
Figure 4:
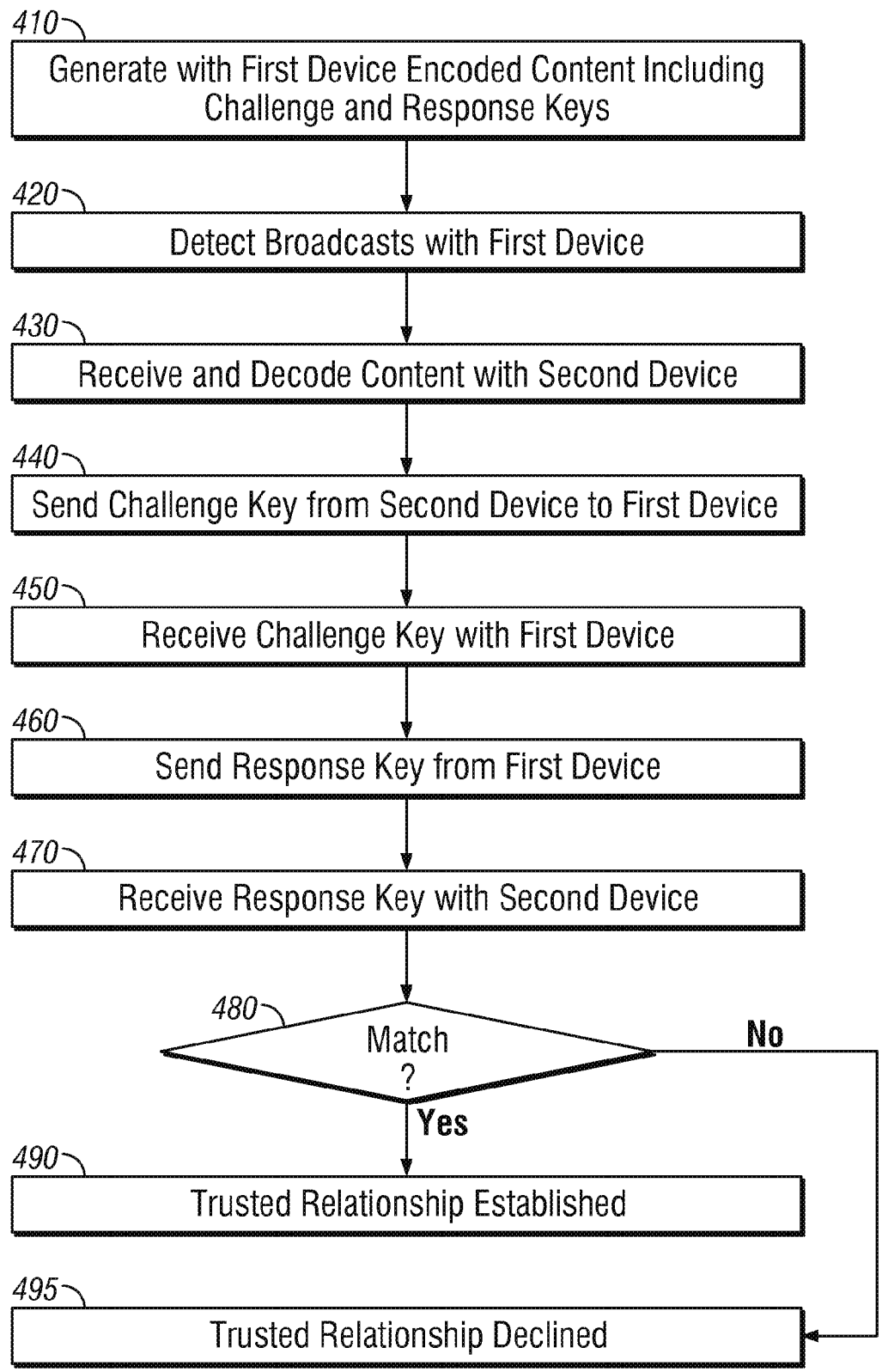

FIGS. 3-4 illustrate process flows depicting example methods of pairing communication devices (including communication devices 110, 210, and 220) via wireless communication when the devices are at the same venue or even a different venue. It should be appreciated that these process flows may represent instructions that may be held in memory 150, which may be executed by logic subsystem 140. As a non-limiting example, the process flows of FIGS. 3-4 may be applied to the devices in FIG. 2 to enable device pairing of first communication device 210 and second communication device 220 via wireless communication 230 by establishing a trusted relationship. It should be appreciated that the process flows of FIGS. 3-4 will be described in the context of first communication device 210, but may be similarly applied to second communication device 220. As such, second communication device 220 may be referred to as a remote communication device in this particular context and first communication device 210 may be simply referred to as the communication device. While the process flow depicts only two communication devices, the process flow is equally applicable to establishing a trusted relationship among three or more communication devices that are located at the same venue.

Referring now to the process flow of FIG. 3 one example of a method for establishing a trusted relationship between a first communication device and a second communication device is described. At 310, authentication information is captured by the first and second communication devices. The authentication information may be, for example, one or more images and/or ambient audio information. For instance, a user of the first communication device 110 may operate image capture device 244 and/or audio capture device 132 to capture the image and/or audio information, respectively. In some embodiments, the first communication device may prompt its user to operate the image capture device and/or the audio capture devices to capture visual and/or audio information, respectively, in response to receiving a device pairing request from another communication device.

At 320, the communication devices send the captured authentication information to the comparison system. The comparison system at 330 compares the authentication information from both devices to determine the probability that there is a pre-established relationship between them. If more than two devices are involved, then a comparison is performed between the authentication information captured by the first communications device and each of the other devices. At 340, if the pre-established relationship exists, the comparison system then sends a list of devices that exhibit this relationship with at least a certain probability to the user of the first communication device. In some implementations the value of a parameter reflecting the probability that a pre-established relationship exists is also sent to the user. The devices on the list serve as candidate devices from which the user can select at 350 those devices with which he or she wishes to establish a trusted relationship. In the present example only the second communication device will appear on the list sent to the first communication device.

In some implementations, the pre-determined relationship may indicate that there is a match between authentication information captured by the first communication device and the authentication information captured by the second communication device. In some cases the authentication information may match to within an error or deviation based on the comparison performed at 340. For example, the comparison system may cause the logic subsystem to judge that the pre-determined relationship is exhibited when the error or the deviation is less than a threshold and may judge that the pre-determined relationship is not exhibited when the error or the deviation is greater than the threshold.

For simplicity the following discussion will from time to time refer to a match between the authentication information captured by the communication devices. However, in these cases a match more generally represents a determination that any pre-established relationship exists between the authentication information captured by the communication devices.

In some implementations, a user of the first communication device may select, set, or adjust the predetermined relationship applied at 330 in accordance with a security preference of the user. As such, it should be appreciated that the first communication device may utilize a pre-determined relationship that is different from a pre-determined relationship utilized by the second communication device to establish a trusted relationship.

In some embodiments, the authentication module of the first communication device may notify the device pairing module that the trusted relationship has been established. In response to receiving a notification from the authentication module that the trusted relationship has been established, the device pairing module may establish at 360 the personal area network with the second communication device. Alternatively, if there is no match between the authentication information captured by both devices, the trusted relationship may be denied by the first communication device. In this case, in some embodiments, the authentication module of the first communication device does not notify the device pairing module that the trusted relationship has been established. Rather, the authentication module of the first communication device may notify the device pairing module that the trusted relationship has been declined, which may cause the device pairing module to decline to establish a personal area network with the second communication device.

As previously mentioned, the authentication information may be any attribute of the physical environment will be largely the same for all devices involved in the pairing process. The attribute may also be one that can be captured by the communication devices. Since many communication devices include both a microphone and a camera, two environmental attributes that may be used are ambient audio and visual information.

If the authentication information includes audio captured by the communication devices, comparison system 250 will perform the comparison process using any suitable technique. For example, captured audio samples may undergo Fast Fourier Transform (FFT) analysis to generate a time-encoded acoustic fingerprint which can be correlated with one another. Since this is a passive sampling technique, it relies upon sufficient ambient audio energy so that it can be captured and analyzed. It should also be sufficiently unique to adequately narrow down the list of candidate devices. A silent room will not offer enough of a signal to perform this process. However, if the environment is sufficiently quiet to have a conversation, and if two users speak simultaneously (e.g., "Let's pair using application XYZ"), this speech will contribute to the ambient audio and can serve as the audio sample.

If, on the other hand, the authentication information includes one or more images captured by the communication devices, comparison system 250 may perform the comparison process using any suitable technique to compare images to one another. For instance, captured images may be analyzed using techniques including one or more of the following: interest point detection, edge detection, corner detection, blob detection, ridge detection, feature detection, object recognition, texture analysis, and blur detection, among others. One currently available service that may be employed to perform image analysis is Photosynth® from Microsoft.

It should be noted that the use ambient audio or images can be used to pair communication devices that are not even in the same venue. Rather, the users of the communication devices may simply be undergoing a shared experience. For example, if the primary contributor to the ambient audio is a single source that is electronically produced at several different locations, then communication devices can be paired when they are in different physical locations. For instance, the users may be at a concert, but physically far apart from one another. Likewise, the audio may be produced by a television speaker when the users are watching a common program such as a sporting event or concert. In this communication devices can be paired when their respective users are all participating in the same event, even when they are not co-located.

When the captured audio or visual information is used by the comparison system to determine the likelihood of a match, the comparison system may use supplemental information that is obtained from the communication devices. For instance, if GPS and/or timestamp information is available, the comparison system may correlate this information to enhance the accuracy of it probability determination.

The above-described techniques are passive pairing techniques (e.g., passive audio and passive visual pairing) in which the communication devices capture information available from their surrounding environment. In other implementations, however, active pairing techniques may be employed in which the first communication device generates the authorization information, which is then captured by the second communication device. For instance, an active audio technique may be employed in which the first communication device generates an audio signal such as a sequence of tones encoding a recognizable pattern, for example. One advantage that arises when an active audio technique is employed is that the audio information that is generated may be used to transfer small sequences of data to the second communication device. For example, the audio information may be used to pass an encryption key or push a content channel URL to the second communication device.

Likewise, in some cases active visual pairing may be employed in which the first communication device generates one or more images that are presented on its display. The second communication device would then capture the visual information directly from the display of the first communication device. Active visual pairing may be particularly useful in those situations where passive visual pairing cannot be used, such as in an environment with low lighting. In some cases the image that is captured by one communication device may even be an image this is displayed on the other communication device involved in the pairing process.

In some implementations the image may be tagged by, for instance, a cloud service. The second communication case could then capture the image and decode the tag, which is looked up on the cloud service to find the data/URL which was set by the first communication device. The decoded tag may include, for example, an object sharing URL (or push client URL), which can be retrieved by the second communication device.

Active visual pairing may also be used to generate a series of tags or barcodes, which can be captured and decoded on the second communication device. In this way a small amount of information can be transferred without the need for an external network connection.

If the communication device includes an accelerometer, such as accelerometer 134 shown in FIG. 1, another type of authentication information that may be used involves device gestures. For instance, if the individuals who wish to establish a personal area network are in sight of one another, one of the individuals may make a gesture (e.g., forming a circle three times) in the air using his or her communication device and one or more of the other individuals may emulate the gesture using their respective communication devices. The accelerometers in the communication devices can determine the motion path followed by the first communication devices. Each communication device can send the motion path information to the comparison system to determine the probability of a match. In some cases the communication devices may first pre-process the motion path information into a gesture signal to reduce its size In yet other implementations the authorization information may include rhythm information in which the first and second devices are tapped together. In this case the comparison system would correlate the rhythm arising from the multiple taps in order to determine if there is a match.

As previously mentioned, active pairing using, e.g., active audio and/or active visual information, may be used to transfer small sequences of data to the second communication device. In some implementations such a transfer of data can be used to replace or supplement the comparison system discussed above. For example, a peer-to-peer challenge/response mechanism can be used to establish the trusted relationship between first and second communication devices.

FIG. 4 shows one example of a method for establishing a trusted relationship between a first communication device and a second communication device using a challenge and response mechanism. First, at 410, the first communication device generates encoded content that includes challenge and response keys. At 420 the first communication device begins capturing information to detect a broadcast that includes the challenge key. In some cases the first communication device will attempt to detect the challenge key on a predefined port. The second communication device receives and decodes the content at 430 and sends back the challenge key to the correct port at 440. The first communication device receives the challenge key at 450 and sends the response key at 460. Finally, at 470, the second communication device receives the response key and determines if there is a match at 480. If there is a match, the second communication device concludes at 490 that the trusted relationship has been established. If there is no match, the second communication device concludes at 495 that a trusted relationship has not been established.

It should be noted that user information (e.g., location information) is only collected and stored after notice has been provided to the user that the collection of personal information may occur, for example, when signing up to use the comparison service. The notice will also indicate that this information will not be shared with third parties, other than as may be needed to maintain or enhance the quality of the service that is being provided. Other policies that are intended to protect the user's privacy and enhance the quality of the user experience may also be employed. Once the user is informed as to the terms of service, the user will be given an opportunity to consent to the terms of service.

Because the comparison service may store and provide access to sometimes sensitive personal information of a user to a network of people, certain security and privacy measures are included to allow the user to control who has access to this information. Through a privacy preference utility, the user can define which characteristics the user can share with others within his or her social network, and set filters to limit access of certain information to only certain users. For example, the user can specify which user or group of users can see the information of the user by defining a "blacklist" of users who are not allowed to see the information. User characteristics whose access may be limited can include the user's location information as well as profile and network interaction information. Some of the security functions include the ability to turn off the information sharing so that the information (e.g., the location of the communication device) cannot be determined by other communication device users. The information sharing on/off feature can be triggered through the website, a mobile application, a customer service call, or via a mobile communication device message, or the like. If the communication device is lost or otherwise compromised, the user can disable access to the service by expiring the session id and wipe all information from the device by means of an appropriate message or signal to the device.

It should be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

As used in this application, the terms "component," "module," "engine," "system," "apparatus," "interface," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications may be made to this configuration without departing from the scope or spirit of the claimed subject matter.

The invention claimed is:

1. A method of pairing communication devices, comprising:
   capturing authorization information of a first type with a first communication device;
   communicating the authorization information to a comparison system;
   if one or more remote communication devices have also captured and sent authorization information of the first type to the comparison system, receiving, at the first communication device, from the comparison system, a list identifying only the one or more remote communication devices that have also captured and sent authorization information of the first type to the comparison system,
      said list further including a value of a parameter associated with each of the remote communication devices, said parameter reflecting a probability that the authorization information of the first type from the one or more remote communication devices identified on the list exhibits a predetermined relationship to the authorization information of the first type received from the first communication device; and
   establishing a trusted relationship with selected ones of the remote communication devices identified on the list.

2. The method of claim 1 further comprising establishing a personal area network between the first communication device and the second communication device if the trusted relationship has been established with the second communication device.

3. The method of claim 1 in which authorization information includes visual information.

4. The method of claim 1 in which authorization information includes audio information.

5. The method of claim 4 in which the audio information is ambient audio captured by the first communication device and a second communication device when in a common venue.

6. The method of claim 4 in which the audio information is generated by the first communication device.

7. The method of claim 3 in which the visual information includes at least one image presented on a display of the first communication device and captured by the remote communication devices identified on the list.

8. The method of claim 1 in which authorization information includes a motion path followed by the first communication device that is emulated by the remote communication devices identified on the list.

9. The method of claim 1 in which the predetermined relationship is a matching relationship in which the authorization information of the first type captured by the remote communication devices identified on the list matches the authentication information of the first type captured by the first communication device, and wherein the predetermined relationship is selected, set or adjusted by a user of each communication device.

10. The method of claim 1 in which communicating the authorization information to the comparison system further comprises sending the authorization information from the first communication device to the comparison system at least in part over a wireless network.

11. The method of claim 3 in which the visual information is generated using the first communication device.

12. The method of claim 1 in which the list is received by a second communication device and the first and second communication devices are located in physically different venues and the authorization information is electronically produced at each venue.

13. One or more computer-readable memory devices containing instructions which, when executed by one or more processors, perform a method comprising:
   capturing authorization information of a first type with a first communication device;
   communicating the authorization information to a comparison system;
   if one or more remote communication devices have also captured and sent authorization information of the first type to the comparison system, receiving, at the first communication device, from the comparison system, a list identifying only the plurality of remote communication devices that have also captured and sent authorization information of the first type to the comparison system,
      said list further including a value of a parameter associated with each of the remote communication devices, said parameter reflecting a probability that the authorization information of the first type from the one or more remote communication devices identified on the list exhibits a predetermined relationship to the authorization information of the first type received from the first communication device;
   establishing a trusted relationship with at least one of the plurality of the remote communication devices having a parameter reflecting a probability above a certain value; and
   declining to establish a trusted relationship with any of the plurality of remote communication devices having a parameter reflecting a probability below the certain value.

14. The one or more computer-readable memory devices of claim 13 further comprising establishing a personal area network between the first communication device and the second communication device if the trusted relationship has been established with the second communication device.

15. The one or more computer-readable memory devices of claim 13 which the list is received by a second communication device and the authorization information is ambient information captured by the first communication device and the second communication when in a common venue.

16. The one or more computer-readable memory devices of claim 13 in which the list is received by a second communication device and the first and second communication devices are located in physically different venues and the authorization information is electronically produced at each venue.

17. A communication device, comprising:
   an information capture device for capturing authorization information received from a physical environment in which the communication device is located;
   a wireless receiver configured to receive data broadcast by remote communication devices;
   a logic subsystem; and
   memory comprising instructions that are executable by the logic subsystem to:
      capture authorization information via the information capture device;
      wirelessly communicate the authorization information to a comparison system;
      receive from the comparison system a list identifying one or more remote communication devices that have also captured and sent authorization information to the comparison system, the one or more remote communication devices identified each having a same authorization type as the communication device, said list further including a value of a parameter associated with each of the remote communication devices, said parameter reflecting a probability that the authorization information from the remote communication devices identified on the list exhibits a predetermined relationship to the authorization information received from the first communication device; and
      establish a trusted relationship with selected ones of the remote communication devices identified on the list.

18. The system of claim 17 in which the authorization information is generated by the communication device.

19. The system of claim 18 in which the authorization information that is generated includes content that has data transferrable to the one or more communication devices prior to establishment of the trusted relationship.

20. The system of claim 19 in which the data that is transferred includes an encryption key or a URL.

* * * * *